United States Patent [19]
Luce

[11] Patent Number: 5,982,650
[45] Date of Patent: Nov. 9, 1999

[54] INTRA-GRID POWER DIRECTOR

[76] Inventor: John W. Luce, 2401 Bayshore Blvd., #1104, Tampa, Fla. 33629-7304

[21] Appl. No.: 09/080,688

[22] Filed: May 18, 1998

Related U.S. Application Data

[63] Continuation-in-part of application No. 08/810,518, Mar. 3, 1997, Pat. No. 5,754,420, which is a continuation-in-part of application No. 08/613,481, Mar. 11, 1996, Pat. No. 5,608,615.

[51] Int. Cl.[6] .................................................... H02M 1/20
[52] U.S. Cl. .......................................................... 363/102
[58] Field of Search .................................... 363/102–105, 363/132, 137, 51, 174; 307/38, 41, 45, 84, 87; 323/205; 318/767, 807, 808, 809; 388/930, 931, 932

[56] References Cited

U.S. PATENT DOCUMENTS

| | | | |
|---|---|---|---|
| 4,019,104 | 4/1977 | Parker | 318/832 |
| 4,039,909 | 8/1977 | Baker | 318/732 |
| 4,338,557 | 7/1982 | Wanlass | 318/729 |
| 4,446,416 | 5/1984 | Wanlass | 318/812 |
| 5,608,615 | 3/1997 | Luce | 363/102 |
| 5,637,972 | 6/1997 | Randall et al. | 318/616 |
| 5,754,420 | 5/1998 | Luce | 363/102 |

FOREIGN PATENT DOCUMENTS

| | | | |
|---|---|---|---|
| 0594571 | 2/1978 | U.S.S.R. | 363/102 |

OTHER PUBLICATIONS

Rauhut, P. & Glavitsch, H., Rotary Transformer Improves Interconnection, *Electrical World*, May 16, 1966, pp. 71–72.
Rauhut, P., "The Rotary Transformer", *Brown Boveri Review*, Sep., 1967, vol. 54, No. 9, pp. 554–564.

*Primary Examiner*—Adolf Deneke Berhane
*Attorney, Agent, or Firm*—David Kiewit

[57] ABSTRACT

The intra-grid power director comprises a polyphase electric machine having a rotor that can be turned through less than a complete revolution within a stator winding. The rotor winding is connected within a transmission line to a first portion of an electric utility power grid, all portions of which operate at the same frequency. The stator winding is connected to the other portion of the grid so as to generate a rotating magnetic field having the same direction of rotation as the field generated by the rotor winding. The power director also comprises an arrangement for selecting an angular relationship between the stator and rotor windings and for sustaining a resultant torque.

9 Claims, 4 Drawing Sheets

INTRA-GRID POWER DIRECTOR

CROSS REFERENCE TO RELATED APPLICATIONS

This application is a continuation in part of the inventor's U.S. application Ser. No. 08/810,518, filed Mar. 3, 1997 and issued as U.S. Pat. No. 5,754,420, which in turn was a continuation in part of his U.S. application Ser. No. 08/613,481, filed on Mar. 11, 1996 and issued as U.S. Pat. No. 5,608,615.

STATEMENT REGARDING FEDERALLY SPONSORED RESEARCH OR DEVELOPMENT

Not Applicable

BACKGROUND OF THE INVENTION

1. Field of the Invention

The invention provides apparatus and method for controlling power flow within a synchronized electric power distribution grid.

2. Background Information

It is an established practice in the generation, transmission and distribution of electric power to interconnect a plurality of polyphase power sources and loads into a "grid" synchronized to have identical frequency, number of electrical phases, and electrical phase angles. Grids may be very large and may include multiple utility systems as well as large numbers of co-generation sites and loads.

In his U.S. Pat. Nos. 5,608,615 and 5,754,420, the inventor teaches apparatus and method for transferring poly-phase electric power from a first grid having a first frequency and first phase to a second grid having a second frequency and second phase without thereby creating harmonic current distortion on either grid, the apparatus comprising a rotating electric machine, having a first winding connected to the first grid, a second winding connected to the second grid and a torque-applying means acting to apply torque between the two windings. The disclosures of U.S. Pat. Nos. 5,608,615 and 5,754,420 are herein incorporated by reference. It is particularly noteworthy that the rotating machine taught in U.S. Pat. Nos. 5,608,615 and 5,754,420 rotated with a speed proportional to the difference in electrical frequency between the two grids.

In his U.S. Pat. No. 5,608,615 the inventor teaches an electric machine structurally similar to a wound rotor induction motor and means of applying a torque thereto, with an angular displacement of the rotor shaft resulting from the application of the torque. U.S. Pat. No. 5,608,615 provides no teaching of the complementary situation of controlling the angular displacement of such a machine and providing means of sustaining the resultant torque.

Within a single power grid there are many interconnections, often in crisscross patterns, that result in multiple paths between two points. Sometimes "loop flow" occurs. For example, 100 Megawatts could be flowing from point A to point B by one route, while 20 Megawatts could be flowing from point B to point A by a different route. A net useable transfer of 80 Megawatts is going from A to B but there are losses associated with the additional 20 Megawatts on both of these routes, and lines on either of the two routes could be overloaded. Consequently, there are occasions when it becomes desirable to force some electric power to flow along a path other than the one with the lowest impedance. That is the subject of this invention.

BRIEF SUMMARY OF THE INVENTION

Apparatus of the invention comprises an electric machine having a movable polyphase winding mounted for limited angular movement within a polyphase stator; means for selecting an angular relationship between the moveable winding and the stator; and means for sustaining the torque generated responsive to a change in the angular relationship in an energized machine. This apparatus may be viewed as being derived from that taught in U.S. Pat. No. 5,608,615 by replacing the torque motor and its power supply with a torque arm and turnbuckle, depicted in the drawing, or with other suitable means for selecting the angular relationship and for sustaining the resultant torque. Additionally, a comparison of the present machine to that of U.S. Pat. No. 5,608,615 indicates that the slip rings and brushes, used in U.S. Pat. No. 5,608,615, can be replaced with flexible leads because the machine of the present invention uses angular displacements of less than 360° of arc. That is, because all elements of a single electric utility grid have the same frequency, the moveable winding does not rotate. The use of flexible leads provides a lower initial cost, reduced maintenance expenses and elimination of the voltage drop otherwise occurring at the point of electrical contact between each brush and the respective slip ring.

It is an object of the invention to provide means of forcing a predetermined quantity of electric power to flow in a direction determined by the angular positioning of a moveable winding, the amount of power flow determined by the angular extent through which the moveable winding is turned.

It is an additional object of the invention to provide phase-shifting apparatus adapted to be installed between a polyphase electric source and a polyphase electric load, wherein the phase of the load voltage is controllably changed by altering the angular setting between a stator winding and a moveable winding adapted to be moved through a limited angular range within the stator winding.

DETAILED DESCRIPTION OF THE INVENTION

Figure 1A:
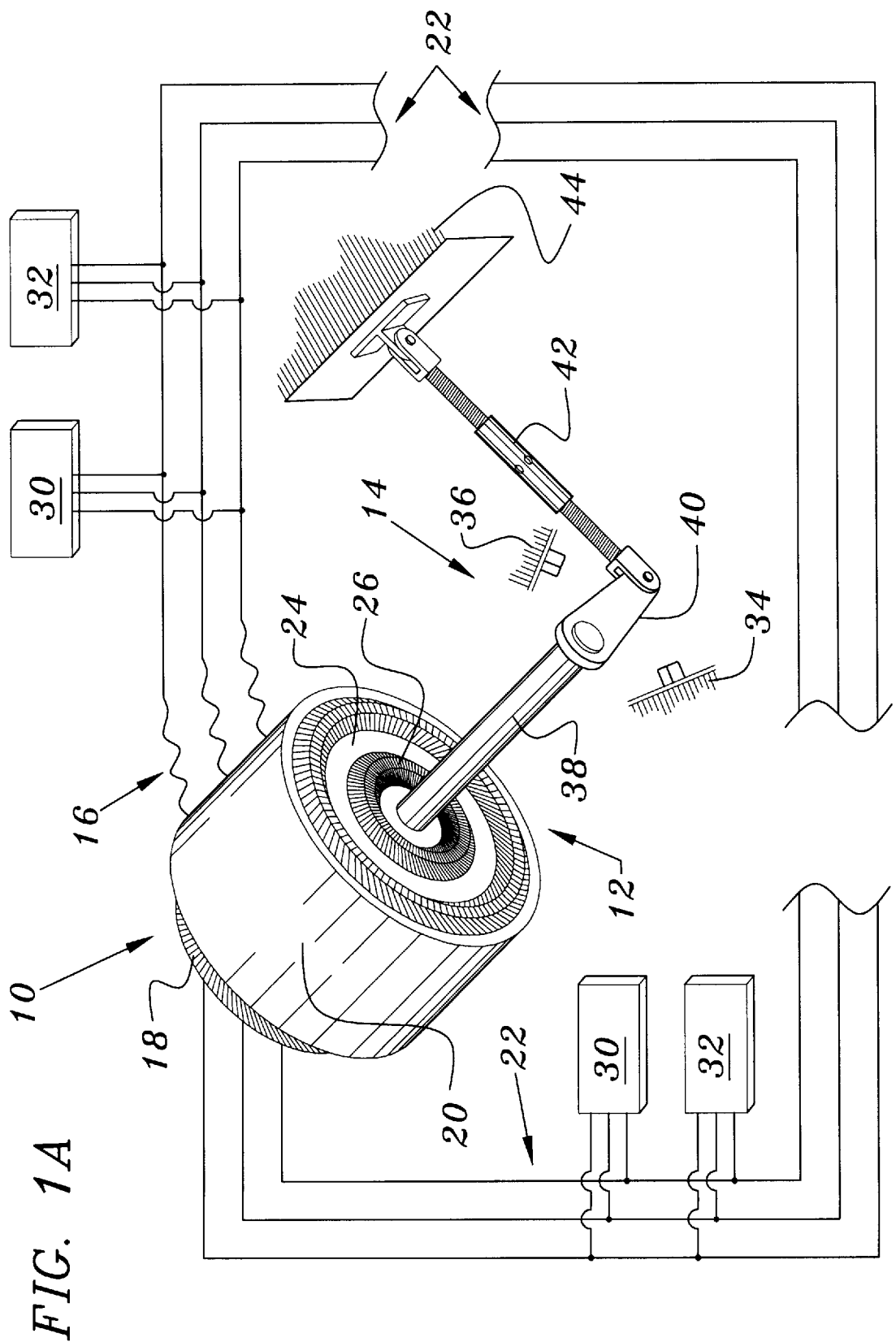
FIG. 1a is a schematic perspective view of a three-phase embodiment of the apparatus of the invention employing a turnbuckle as a torque-sustaining means
Figure 1B:
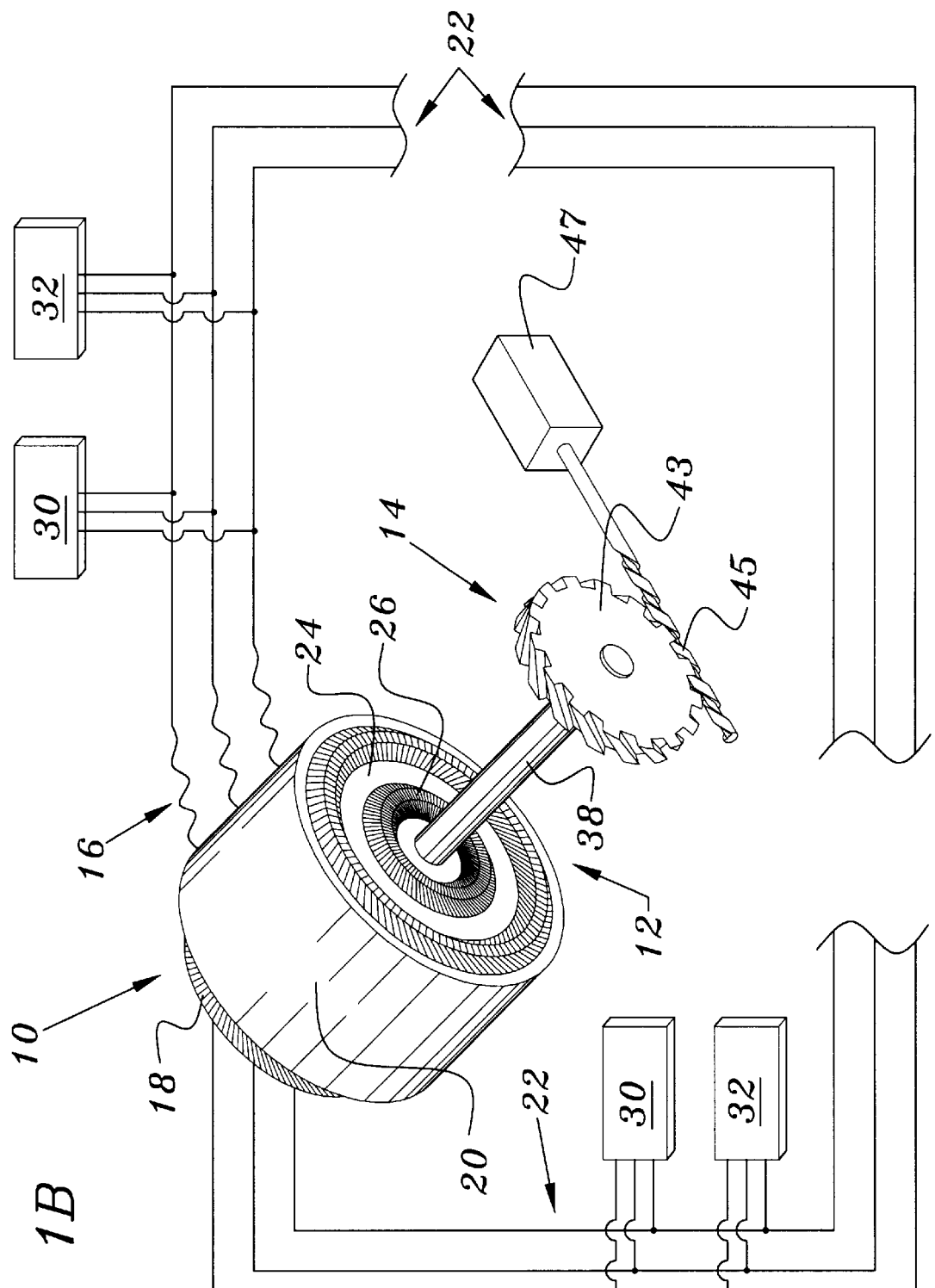
FIG. 1b is a schematic perspective view of a three-phase embodiment of the apparatus of the invention employing a worm gear arrangement as a torque-sustaining means.

Turning initially to FIGS. 1a and 1b, one finds embodiments of the intra-grid power director 10 of the invention comprising an electrical machine 12 and an angle setting means 14 used for introducing and maintaining a selectable angular displacement between a moveable 26 and a fixed 18 winding and capable of sustaining the torque associated with that angular displacement. In a preferred embodiment the electrical machine 12 is very much like a wound rotor induction motor in which the rotor is limited to turning to and fro through less than 360° of arc, in which the rotor slots and windings are designed to carry full power at all times, and in which the sliprings and brushes have been replaced with flexible electrical connections 16. Although the angularly moveable portion 24 of the electrical machine 12 does not rotate through an entire revolution, it is nonetheless hereinafter referred to as a "rotor" and the winding disposed thereupon is referred to as a rotor winding 26. Because the apparatus of the invention 10 may be used to transfer power in either of the two possible directions, both the rotor and stator windings are preferably designed to have the same power rating, which is not commonly the situation for an induction motor.

Although the electrical machine 12 is depicted in a preferred configuration in which rotor windings 26 are disposed about a shaft 38 movable through a limited angular range within a fixedly mounted stator 20, it will be recognized by those skilled in the art that other known configurations could be employed. For example, an electrical machine 12 could be configured with two sets of polyphase coils facing each other and having coaxially coincident magnetic fields, wherein one of the sets of coils could move angularly relative to the other. This facing coil configuration could have an advantage in that the two sets of coils could easily be made to have the same size and shape and thereby to provide identical power ratings.

It is also well known to make an electrical machine having two sets of coaxial polyphase coils in which the outer of the two sets of coils turns about a shaft while the inner set is held stationary (i.e., a configuration similar to a loom motor). It is additionally known (e.g., in the art of electrically propelled torpedoes) to configure an electric machine similar to a motor in which both the rotor and stator rotate in a fixed frame of reference (in the torpedo example each of two counter-rotating propellers is driven by one of the rotating sets of coils). What is important to the invention is that the electrical machine 12 comprises two sets of polyphase windings having coincident magnetic fields, and that one of the windings can be angularly displaced relative to the other coil in either of the two possible angular senses about a common axis.

The power director 10 is connected within a conventional power grid 22 at a point from which one wishes to force electric power to follow a selected path that is not necessarily the path having the lowest impedance. As is conventional, the grid 22 comprises many power sources 30 and loads 32 and is controlled so that all of the sources 30 operate at the same frequency and phase.

If the apparatus taught in U.S. Pat. No. 5,608,615 is connected between two grids having the same frequency, and no torque is applied to the shaft, the rotor of that electrical machine will initially move until the fields are aligned. Thereafter, the rotor will remain stationary, the fields will rotate at synchronous speed and the flux density will be determined by the winding-turns, voltages and frequency, as is well known in the art. Thus, in the present case, where both windings are connected to the same grid and are necessarily at the same frequency and phase, in the absence of an applied torque, the rotor 24 moves through less than a complete revolution to a resting position, generally referred to as a zero torque angle, at which the magnetic fields associated with the stator and rotor windings 18, 26, are aligned.

As was taught in U.S. Pat. No. 5,608,615, power is transferred between the rotor 24 and stator 20 sides of the power director 10 by applying torque to the shaft 38. If torque is applied in the same direction as that of the rotating magnetic field, power is transferred from the rotor windings 26 to the stator windings 18. Conversely, if the applied torque is directed oppositely to the rotating magnetic field, power is transferred from the stator windings 18 to the rotor windings 26. The amount of power transferred is controlled by the angular extent to which the shaft 38 is turned from its resting position by a suitable angular position setting means 14. That is, any change in the torque angle is accompanied by a corresponding change in torque, and vice-versa. In the teaching of U.S. 5,608,615 the torque was treated as an independent variable and the corresponding angle was a dependent variable. In the present invention the torque angle is the independent variable and the corresponding torque is a dependent quantity.

FIG. 1*a* depicts an angular position setting means 14 comprising a crank arm 40, a turnbuckle 42 attached to a fixed support 44, and two fixed motion-limiting stops 34, 36, while FIG. 1*b* depicts a worm gear arrangement comprising a worm gear 43, a worm 45 and a worm gear drive 47. This alternate worm-and-wheel arrangement is applicable to the power director 10, but would not be suitable for the grid-to-grid transfer apparatuses taught by the inventor in U.S. Pat. Nos. 5,754,420 and 5,608,615 because the worm-and-wheel would prevent four quadrant operation. Operation within a single frequency-synchronized grid obviates the necessity of four quadrant operation. It will be clear to those skilled in the arts associated with electrical machinery that many other approaches could be adopted to serve the same goal of setting a torque angle and sustaining a resultant torque in order to transfer power from one side of the power director 10 to the other. For example, one could replace the turnbuckle 42 depicted in FIG. 1*a* with a pneumatic or hydraulic cylinder (not shown) that might be more convenient to control if the angle were to be frequently reset.

Figure 2:
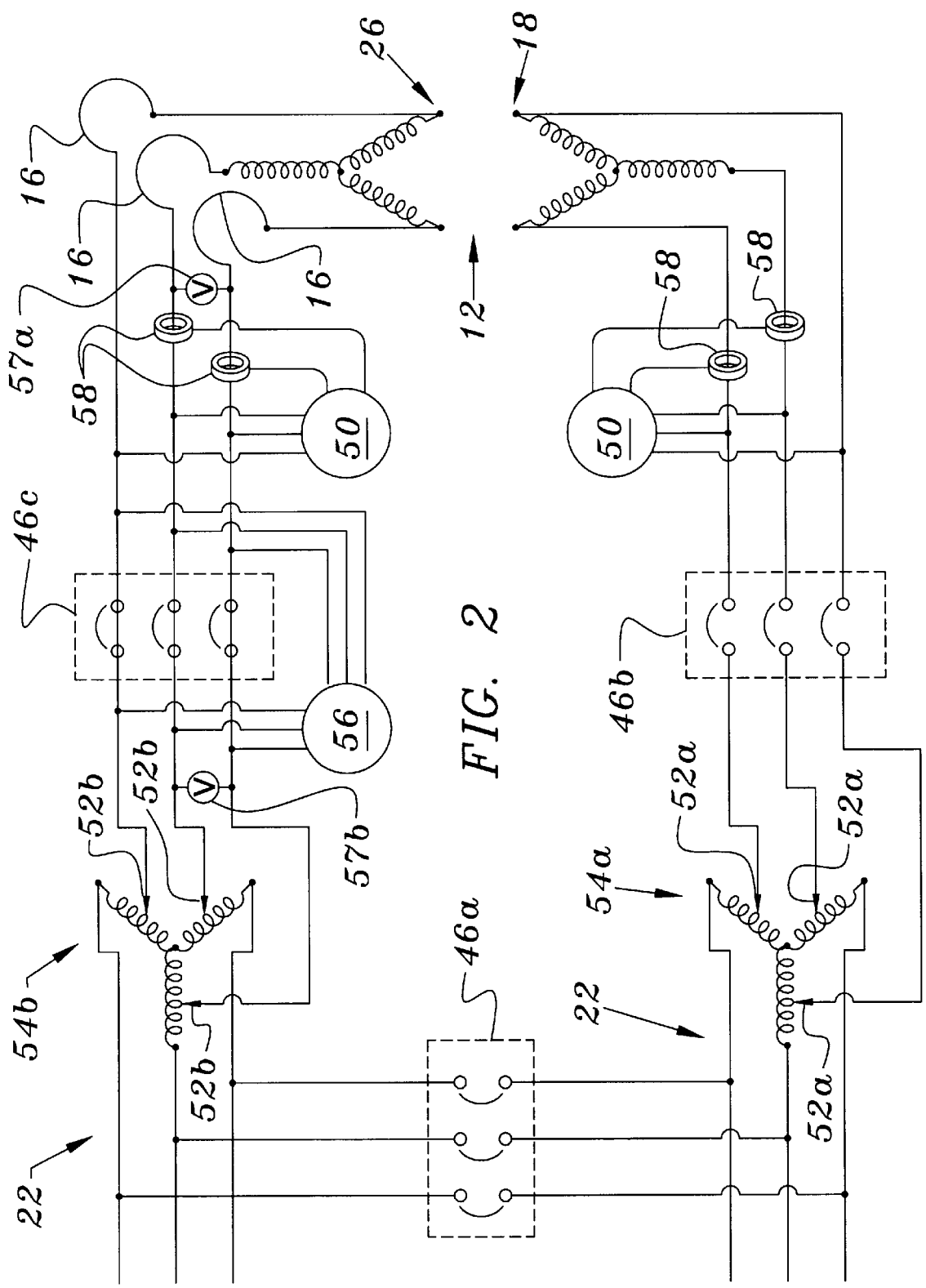
FIG. 2 is a schematic electrical circuit diagram of a three-phase version of the apparatus of the invention

The power director 10 of the invention may be connected within a grid 22 as depicted in FIG. 2, which is similar to FIG. 2 of U.S. Pat. No. 5,608,615. In this case, because the rotor 24 does not rotate through a complete revolution, the slip rings of the earlier apparatus are replaced with flexible connectors 16. When connecting the power director 10, the bypass contactor 46*a* is initially closed, while the contactors 46*b*, 46*c* on the two sides of the power director 10 are open. A first side of the power director 10 is then connected to the grid 22 by closing a contactor 46*b*. A synchroscope 56, attached across the open contactor 46*c* is monitored while the angular position setting means 14 is adjusted so as to attain synchronism. Voltage taps 52*a*, 52*b* may then be adjusted to match the voltages measured with voltmeters 57*a*, 57*b*, following which the contactor 46*c* on the second side of the power director 10 is connected and the bypass contactor 46*a* is promptly opened. The angular position setting means 14 may then be used to control the direction and amount of power transferred, while the transformer taps 52*a*, 52*b* may be adjusted to attain a desired power factor (as depicted in FIG. 2 by power factor meter 50 and current transformers 58), inasmuch as changing the torque angle leads to changes in the power factor. It may be noted that in some applications, where power factor adjustments are not anticipated, the transformers 54*a*, 54*b* on the two sides of the power director 10 may be omitted.

Figure 3:
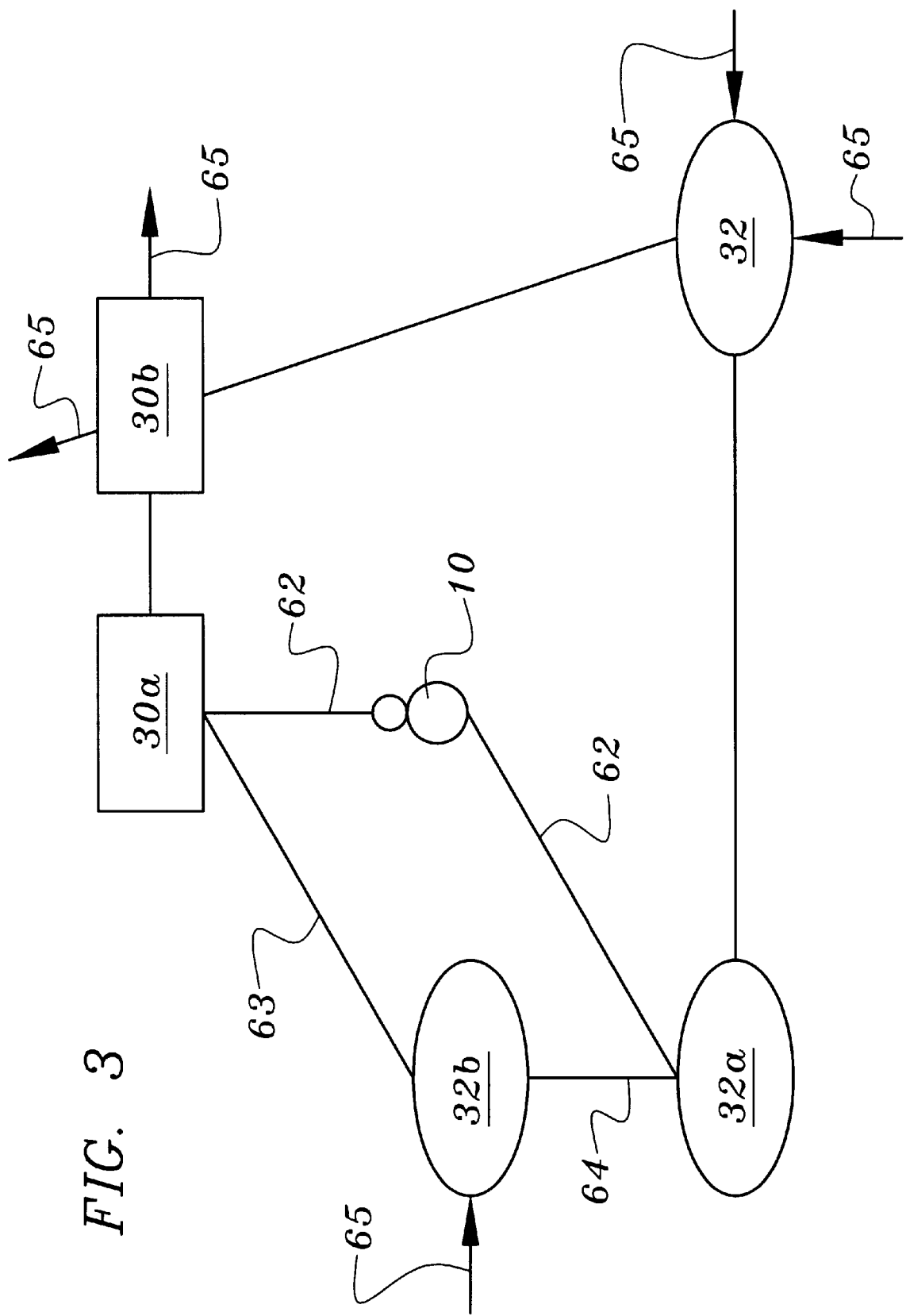
FIG. 3 is a schematic plan view of apparatus of the invention installed in a portion of a utility grid.

The power director 10 has the interesting and useful property of being able to force a predetermined quantity of electric power to flow through it, in a direction determined by the sense the rotor shaft 38 is turned in and in an amount determined by the amount the rotor shaft 38 is turned. An example of the operation of the power director 10 is depicted in FIG. 3 where a generator 30*a*, capable of supplying at least one hundred fifty megawatts feeds both a fifty megawatt load 32*a* and a one hundred megawatt load 32*b* via three separate seventy five megawatt capacity power lines 62, 63, 64, one of which 64 connects the two loads 32*a*, 32*b*. A power director 10 may be connected into one of the transmission lines 62 and then set so as to feed seventy five megawatts down the line 62 connecting the generator 30*a* to the smaller of the two loads 32*a*. By doing this one can balance the system and avoid overloading any of the lines 62, 63, 64. In the depiction of FIG. 3, it is noted that other connections of the sources and loads into the overall grid are shown with arrowheaded lines 65.

If the power director 10 is installed between a source and a load (i.e., not in a grid) it will act as a transformer, albeit a rotating field transformer rather than the more familiar oscillating field transformer. Torque will occur between rotor and stator, but the torque arm and turnbuckle will prevent rotation. If the turnbuckle is adjusted, it will merely shift the phase of the load voltages. In this way the power director 10 can be used as a phase shifter but it cannot force power to flow in a desired direction as it would when used within a synchronized grid as described above.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

I claim:

1. Apparatus for transferring polyphase electric power from a first portion of an electric utility grid to a second portion of the grid, the apparatus comprising an electric machine and an angular position setting means operatively connected to a shaft of the electric machine, wherein the electric machine comprises a first set of windings adapted to generate a first rotating magnetic field having a predetermined direction of rotation about the shaft when connected to the first portion of the grid, and a second set of windings adapted to generate a second rotating magnetic field having the predetermined direction of rotation about the shaft when connected to the second portion of the grid; and wherein the angular position setting means comprises means adapted to turn the shaft to a predetermined angular position and means adapted to hold the shaft at the predetermined angular position.

2. The apparatus of claim 1 wherein the first set of windings comprises rotor windings and the second set of windings comprises stator windings.

3. The apparatus of claim 1 wherein the means adapted to turn the shaft comprise a crank arm and a turnbuckle and wherein the means adapted to hold the shaft comprise a fixed support.

4. The apparatus of claim 1 wherein the angular position setting means comprises a worm gear arrangement.

5. The apparatus of claim 1 wherein the angular position setting means comprises means for sustaining a torque generated responsive to the first winding being connected to the first portion of the grid and the second winding being connected to the second portion of the grid.

6. The apparatus of claim 1 wherein the first set of windings comprises rotor windings and the second set of windings comprises stator windings, and wherein the means adapted to turn the shaft comprise a crank arm and a turnbuckle and wherein the means adapted to hold the shaft comprise a fixed support.

7. The apparatus of claim 1 wherein the first set of windings comprises rotor windings and the second set of windings comprises stator windings, and wherein the means adapted to turn the shaft and the means adapted to hold the shaft comprise a worm gear arrangement.

8. A method of transmitting a predetermined amount of polyphase electric power through a transmission line from a first portion of an electric utility grid to a second portion of the electric utility grid, the method comprising the steps of:

a) connecting a power director comprising a first set of windings electrically connected to the first portion of the grid and a second set of windings electrically connected to the second portion of the grid, into the line by a1) connecting the first set of windings of the power director to the first portion of the grid so as to generate a first rotating magnetic field having a predetermined direction of rotation about a shaft of the power director and a2) connecting the second set of windings of the power director to the second portion of the grid so as to generate a second rotating magnetic field having the predetermined direction of rotation about the shaft of the power director b) turning the shaft until the predetermined amount of power flows from the first portion of the electric utility grid to the second portion of the electric utility grid.

9. In a polyphase electric utility grid comprising a first plurality of sources of polyphase electric power, a second plurality of electric loads and a third plurality of transmission lines, a predetermined one of the lines electrically connecting a predetermined one of the sources to a predetermined one of the loads, an improvement comprising a power director electrically connected to the predetermined line, the power director comprising:

a first set of windings electrically connected to the predetermined source so as to generate a first rotating magnetic field having a predetermined direction of rotation about a shaft, a second set of windings electrically connected to the predetermined load so as to generate a second rotating magnetic field having the predetermined direction of rotation about the shaft; and an angular position setting means adapted to hold the shaft at a predetermined angular position.

* * * * *